Patented Mar. 8, 1938

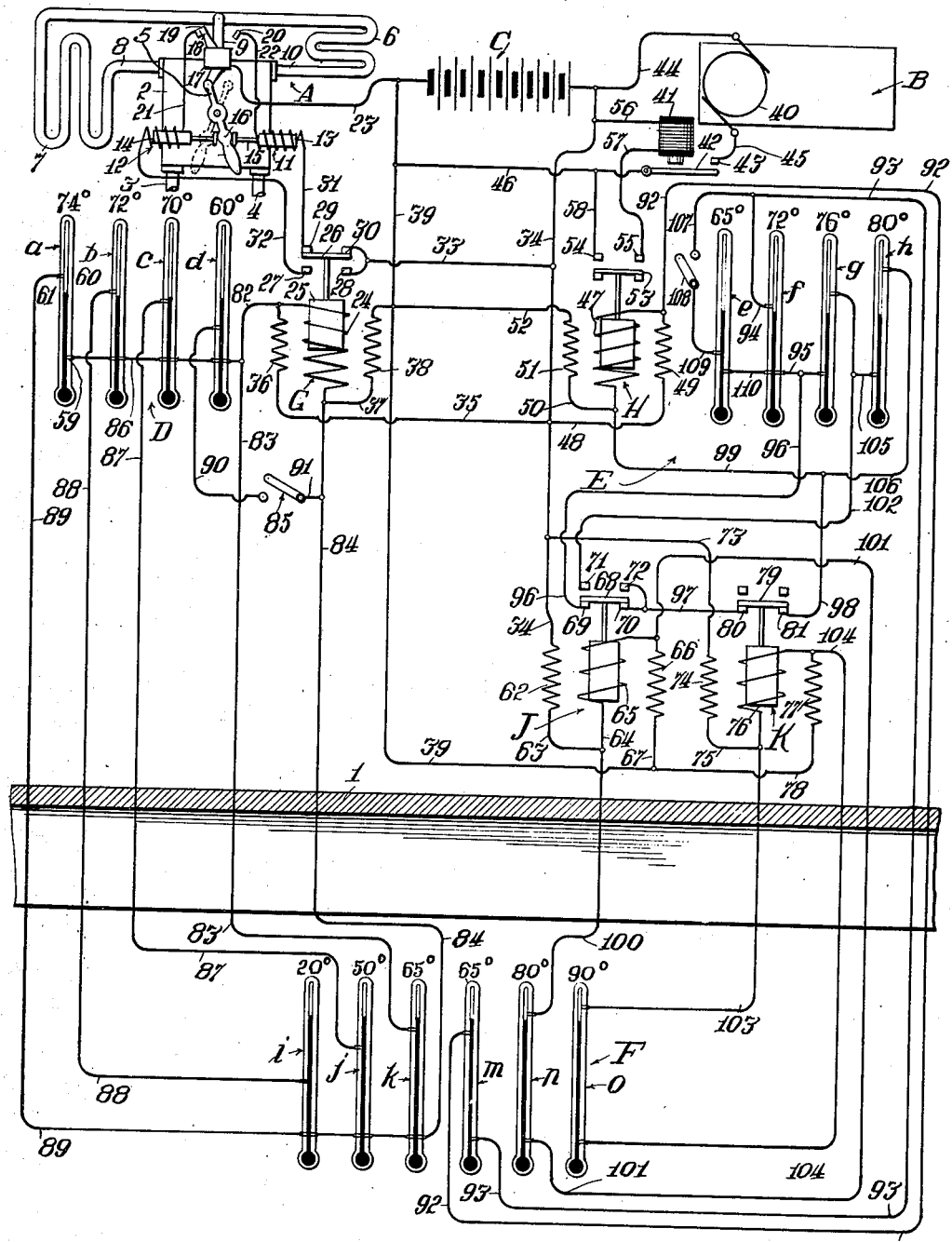

2,110,168

UNITED STATES PATENT OFFICE 2,110,168

THERMOSTATIC CONTROL FOR TEMPERATURE REGULATING SYSTEMS

Paul B. Parks, Oak Park, and William M. Smith, Chicago, Ill., assignors to Vapor Car Heating Company, Inc., Chicago, Ill., a corporation of New York Application October 15, 1932, Serial No. 638,004

19 Claims. (Cl. 236—1)

This invention relates to certain new and useful improvements in a temperature regulating system for railway cars, and more particularly to an automatically operating thermostatically controlled system comprising both a heating means and a refrigerating means, said system functioning to maintain a selected temperature within the car, said temperature being selected in accordance with the temperature prevailing at that time outside of the car.

Briefly described, the railway car is provided with a heat exchange system comprising a heating apparatus and a refrigerating apparatus which are separately and independently operable, although only one or the other is permitted to operate at any one time. A thermostatic control mechanism is provided for each of the heating and refrigerating mechanisms, whereby whichever mechanism is operative may be automatically controlled to maintain a selected temperature within the car. A second thermostatic control mechanism, comprising a plurality of progressively operating thermostats is positioned outside the car so as to respond to changes in the outside temperature. This outside group of thermostats is electrically connected with the inside thermostatic control mechanism so that the outside thermostats shall determine whether, at any one time, the heating apparatus or the refrigerating apparatus shall be operative and the outside thermostats also automatically select the temperature to be maintained within the car by the heating or refrigerating apparatus. In this way the control system is made entirely automatic so that a proper and desirable car temperature is maintained no matter what the outside temperature may be.

The principal object of this invention is to provide an automatically operating thermostatically controlled apparatus for regulating the temperature in a railway car, such as briefly described hereinabove and disclosed more in detail in the specifications which follow.

Another object is to provide a car temperature regulating apparatus comprising heating means and cooling means, and thermostatic mechanism positioned outside the car and responsive to outside temperatures for determining whether the heating means or the cooling means shall be operative.

Another object is to provide railway car temperature regulating apparatus comprising means positioned outside the car for selecting the temperature to be maintained within the car.

Another object is to provide, in connection with a temperature regulating system of the type herein disclosed, means for maintaining certain predetermined maximum or minimum temperatures within the car at night, or at other times when the car is not in service.

Other objects and advantages of this invention will be more apparent from the following detailed description of one approved form of apparatus constructed and operating according to the principles of this invention.

In the accompanying drawing, the single figure shows diagrammatically the principal elements of the system together with the electric wiring connections.

At 1 is indicated the floor of a railway car, and it is to be understood that all of the mechanism shown above this floor 1 will preferably be positioned within the car. The thermostatic mechanism shown above floor 1 must be positioned within the car, but it will be apparent that certain portions of the heating and refrigerating apparatus may be positioned outside the car without changing the operation as hereinafter described. The group of thermostats shown below the floor 1 are positioned outside of the car so as to respond to outside temperatures.

The heating apparatus A may be of any approved type, and is here shown as a vapor-car heating system well known in the art. At 2 is indicated the control or distributing valve to which steam or vapor flows through pipe 3 from the vapor regulator, steam and condensate being returned to the vapor regulator through pipe 4. When the valve lever 5 is in the position shown in solid lines in the drawing, the valve is closed and steam or vapor can simply flow into the valve 2 through pipe 3 and out through pipe 4 but no steam is supplied to the radiating system. When the control lever 5 is swung to the position indicated in dotted lines, the valve is opened and steam can flow through the radiators indicated diagrammatically at 6 and 7, these radiators being connected with the valve by the pipes indicated at 8, 9 and 10. The valve is operated by a pair of similar solenoids or magnetic motors 11 and 12, the respective cores 13 and 14 of the solenoids being mounted at the opposite ends of a slide member 15 which is centrally connected at 16 with the valve lever 5. When solenoid 11 is energized the valve will be swung to the closed position shown in the drawing. When solenoid 12 is energized the valve will be opened. The snap-switch indicated at 17 is connected with valve lever 5 so as to be operated by the lever as it approaches either limit of its movement, the movable contact 18 of the switch being snapped alternatively into engagement with one or the other of the fixed contacts 19 or 20. One terminal of solenoid coil 12 is connected through wire 21 with fixed contact 19, and one terminal of solenoid coil 11 is connected through wire 22 with fixed contact 20. The movable contact 18 of the snap switch is connected through wire 23 with one terminal of the source of power C, which is here indicated diagrammatically as a storage battery.

The relay indicated generally at G comprises an electro-magnetic coil 24 adapted, when energized, to draw down the core or armature 25 thereby moving contact plate 26 into engagement with the fixed contacts 27 and 28. When the coil 24 is deenergized, the contact plate 26 will be moved into engagement with fixed contacts 29 and 30 (the position shown in the drawing) by a spring or other suitable means not here shown. The remaining terminals of solenoid coils 11 and 12 are connected through wires 31 and 32 with the fixed terminals 29 and 27 respectively. The fixed contacts 30 and 28 are connected through wire 33 with the wire 34 leading to the other terminal of battery C.

Assuming now that the coil 24 of relay G is energized, the contact plate 26 will be moved down from the position shown in the drawing so as to bridge the fixed contacts 27 and 28. Current will now flow from battery C over the following circuit: From the positive terminal of the battery through wires 34 and 33, contact 28, movable contact plate 26, fixed contact 27, wire 32, solenoid coil 12, wire 21, fixed and movable contacts 19 and 18 of the snap switch 17, and through wire 23 back to the negative terminal of the battery. Solenoid motor 12 will now be energized so as to swing the valve lever 5 over to the dotted line position and open the valve. As this movement is completed, the snap switch 17 will be actuated to move contact 18 out of engagement with fixed contact 19 and into engagement with fixed contact 20, thus breaking the operating circuit just described. When relay coil 24 is again deenergized, contact plate 26 will be moved back into engagement with fixed contacts 29 and 30 (as shown in the drawing) and a second circuit will be completed as follows: From battery C through wires 34 and 33, fixed contact 30, contact plate 26, fixed contact 29, wire 31, solenoid coil 11, wire 22, fixed and movable contacts 20 and 18 of snap switch 17, and thence as before over wire 23 back to the battery. Motor 11 will now be energized to swing the valve back to the closed position and the parts will all be returned to the position shown in solid lines in the drawing. It will thus be seen that whenever relay G is energized the valve 2 will be opened to supply steam to the radiators, and when the relay G is deenergized the valve 2 will be closed so as to cut off the flow of steam to the radiators. The relay G is normally energized by current flowing through the following circuit: From battery C through wires 34 and 35, resistance 36, solenoid coil 24, wire 37, resistance 38, and wire 39 back to the battery. At times the solenoid coil 24 is deenergized by short-circuiting the current through one or another of certain shunt circuits connected around this coil and hereinafter described.

The refrigerating apparatus B may be of any suitable type. In the example here shown diagrammatically, the motor which drives the compressor of a compression refrigerating system is indicated at 40. The control magnet indicated at 41 is adapted, when energized, to draw up the movable contact member 42 into engagement with a fixed contact 43. This will complete a motor operating circuit as follows: From battery C through wire 44, motor armature 40, wire 45, fixed contact 43, movable contact 42, and wires 46 and 39 back to the battery. When magnet 41 is deenergized, this motor circuit will be broken and the refrigerating system will cease to operate. The control relay H is of the same general type as the relay G previously described. The solenoid coil 47 of this relay H is normally energized through the following circuit: From battery C through wires 34 and 48, resistance 49, solenoid coil 47, wire 50, resistance 51, and wires 52 and 39 back to the battery. When so energized, the movable contact plate 53 will be moved down to the position shown in the drawing. When the relay is deenergized, contact plate 53 will be moved up into engagement with fixed contacts 54 and 55 thus completing the following circuit through magnet 41: From battery C through wires 34 and 56, magnet coil 41, wire 57, fixed contact 55, movable contact plate 53, fixed contact 54, and wires 58, 46, and 39 back to the battery. When this control circuit is completed, the operating circuit of motor 40 will be closed and the refrigerating system will be put in operation. It will thus be seen that whenever relay H is energized the refrigerating system will be inoperative, and when the relay H is deenergized the refrigerating system will be operative. The relay H is deenergized at times by short-circuiting the solenoid coil 47 through one or another of a series of thermostatically controlled shunt circuits as hereinafter described.

The inside thermostatic control mechanism D for the heating system A comprises, in addition to the relay G already described, a plurality of similar thermostats $a$, $b$, $c$, and $d$. Each of these thermostats is adapted to complete a circuit when a certain predetermined temperature is reached within the car. A number of different forms of thermostats might be used, but in the example here shown the thermostats are of the mercury column or thermometer type. A lower electrical contact member 59 (see thermostat $a$) is in continual engagement with the mercury column 60 which rises at a certain temperature so as to make contact with a second fixed contact member 61 thus completing a circuit through the two fixed contacts 59 and 61 and the mercury column 60. By setting the fixed contacts 61 at different heights in the tubes, or by adjusting the amount of mercury or the areas of the tubes, the respective thermostats may be adjusted so that each will function to complete its circuit at a certain predetermined temperature. In the example here shown, thermostat $a$ functions at 74° Fahrenheit, thermostat $b$ at 72° Fahrenheit, thermostat $c$ at 70° and thermostat $d$ at 60°. It is to be understood that these temperatures, as well as those hereinafter given for the other thermostats of the system, are merely fixed by way of example and might be changed as desired.

The thermostatic control mechanism E for the refrigerating apparatus B comprises, in addition to the relay H, a plurality of thermostats $e$, $f$, $g$, and $h$ which may be of the same type as the thermostats $a$ to $d$ already described. Thermostat $e$ may be, for example, adjusted to close its circuit at 65° Fahrenheit, thermostat $f$ at 72°, thermostat $g$ at 76°, and thermostat $h$ at 80°. The control mechanism E also comprises a pair of relays J and K which may each be of the same type as the relays G and H already described. Relay J is normally energized by current flowing over the following circuit: From battery C through wire 34, resistance 62, wires 63 and 64, solenoid coil 65, resistance 66, and wires 67 and 39 back to the battery. When this relay is energized, the movable contact plate 68 will be drawn down into engagement with the fixed contacts 69 and 70. When the relay is deenergized, movable contact plate 68 will be moved up into engagement with fixed contacts 71 and 72. The relay K is normally energized by current flowing over the following circuit: From battery C through wires 34 and 73, resistance 74, wire 75, solenoid coil 76, resistance 77, and wires 78 and 39 back to the battery. When so energized, the movable contact plate 79 will be pulled down so as to complete a circuit between the fixed contacts 80 and 81. When relay K is deenergized, the movable contact plate 79 will be moved up so as to break this circuit.

The outside thermostatic mechanism F comprises a plurality of thermostats $i$, $j$, $k$, $m$, $n$ and $o$ which may be of the same type as thermostats $a$ to $h$ already described. These thermostats are mounted, preferably beneath the car, so as to be waterproofed and protected from injury by flying objects and cushioned against the shocks incidental to the movements of the car. These thermostats should be so exposed or mounted as to be promptly responsive to changes in the temperature prevailing outside the car. In the example here shown, the thermostat $i$ is operative to close its circuit at a temperature of 20° Fahrenheit, thermostat $j$ at 50°, thermostats $k$ and $m$ at 65°, thermostat $n$ at 80° and thermostat $o$ at 90°.

Referring now to the general operation of the system, the parts are shown in the drawing in the positions assumed when the outside temperature is between 65° and 80° and the temperature within the car has been established somewhat below 72°. At such a time the heating system is entirely inoperative, and the refrigerating system is also inoperative although it may be assumed that it has just been operating to bring the car temperature down below 72° Fahrenheit. The refrigerating system B will again go into operation to withdraw heat from the car whenever the car temperature rises above 72°.

Whenever the outside temperature is above 65°, the heating system is rendered inoperative by the thermostat $k$ which completes a shunt circuit around the coil of relay G as follows: From one terminal of coil 24 through wires 82 and 83, thermostat $k$, and wire 84 back to the other terminal of the coil 24. Assuming that the outside temperature falls below 65° but is above 50°, the circuit just described will be broken and the heating system may operate, the heating system then being controlled by the thermostat $c$ to maintain a temperature inside the car of approximately 70°. (The thermostat $d$ is normally inoperative, being controlled by the normally open manually operated switch 85). As long as the car temperature is below 70°, the relay G will be energized, in the manner already described, so as to open the valve 2 and permit the heating system to function. When the temperature within the car rises to 70°, a shunt circuit which short-circuits the coil 24 of relay G will be completed as follows: From one terminal of coil 24 through wires 82 and 86, thermostat $c$, wire 87, thermostat $j$, and wire 84 back to the other terminal of coil 24. This will deenergize the relay G so as to cause valve 2 to be closed. When the car temperature again falls below 70°, the circuit just described will be broken, whereupon relay G will again be energized and valve 2 will be opened to permit a renewed supply of steam to flow through the radiators. In this manner the temperature within the car will be maintained at approximately 70° Fahrenheit. It will be noted that this control circuit can only be completed so long as the temperature outside the car remains above 50° Fahrenheit. Assuming that the outside temperature falls below 50° but is above 20°, the thermostat $c$ will no longer be in control of the car but the thermostat $b$ will be in control to maintain a car temperature of approximately 72°. When a car temperature of 72° is reached, the relay G will be short-circuited so as to close valve 2 by the completion of the following shunt circuit: From relay coil 24 through wires 82 and 86, thermostat $b$, wire 88, thermostat $i$, and wire 84 back to the other terminal of the relay coil. Thermostat $b$ will continue in control of the heating system until the outside temperature falls below 20°, whereupon the control circuit just described will be broken at the thermostat $i$, and the inside thermostat $a$ will be put in control of the heating system so as to maintain the temperature inside the car at approximately 74°. The control circuit by which relay G is now short-circuited is as follows: From relay coil 24 through wires 82 and 86, thermostat $a$, and wires 89 and 84 back to the other terminal of the relay coil. It will be noted that as the outside temperature falls, a somewhat higher temperature is selected to be maintained within the car. This is desirable on account of the greater heat losses from the car that will occur for various reasons when such extremely low outside temperatures prevail.

At night when the occupants of the car are sleeping, or at times when the car is out of service, it may be desirable to maintain a lower temperature in the car, for example 60°, and at such times the switch 85 will be closed. At such times a control circuit through thermostat $d$ will be established as follows: From relay coil 24 through wires 82 and 86, thermostat $d$, wire 90, switch 85, and wires 91 and 84 back to the relay coil. Of course, this thermostat $d$, like the thermostats $a$, $b$ and $c$, is only operative while the outside temperature is below 65° Fahrenheit, otherwise the heating system will be rendered entirely inoperative by the continuous short-circuiting of relay G through the outside thermostat $k$.

Let us now assume that the outside temperature has risen above 65° but is less than 80°. Under these conditions the refrigerating system B will be operative to withdraw heat from the car, and the car temperature will be maintained at approximately 72° by the thermostat $f$. Assuming that the temperature within the car rises to or above 72°, the relay H will be short-circuited through the following shunt circuit: From one terminal of coil 47 through wire 92, thermostat $m$, wire 93, wire 94, thermostat $f$, wires 95 and 96, fixed contacts 69 and 70 and movable contact plate 68 of the relay J, wire 97, fixed contacts 80 and 81 and movable contact plate 79 of the relay K, and wires 98 and 99 back to the other terminal of relay coil 47. The completion of this circuit will deenergize the relay H, thus permitting the movable contact plate 53 to move up and complete the circuit across fixed contacts 54 and 55, whereupon magnet 41 will be operative to close the operating circuit of motor 40 of the refrigerating system B. The refrigerating system will continue to operate until the car temperature has been lowered below 72°, whereupon the shunt circuit just described will again be broken and relay H will be energized to draw down the contact plate 53 and render the refrigerating apparatus temporarily inoperative.

When the outside temperature is quite warm, it is not desirable to have too great a differential between this outside temperature and the temperature within the car or the passengers will feel unduly chilled when entering the car. When the outside temperature reaches 80°, the outside thermostat n will complete a circuit short-circuiting the relay J, this shunt circuit being as follows: From one terminal of solenoid coil 65 through wire 100, thermostat n, and wire 101 back to the other terminal of the coil. This will deenergize relay J so that the contact plate 68 will move up out of engagement with fixed contacts 69 and 70 and will complete a circuit across fixed contacts 71 and 72. This will break the control circuit through thermostat f and will complete another control circuit through thermostat g when the temperature within the car reaches 76° Fahrenheit, this latter shunt circuit being as follows: From one terminal of coil 47 of relay H through wire 92, thermostat m, wire 93, wire 94, thermostat f, wire 95, thermostat g, wire 102, fixed contacts 71 and 72 and contact plate 68 of relay J, wire 97, contacts 80, 79 and 81 of relay K, and wires 98 and 99 back to the other terminal of coil 47. In the same manner as already described this will deenergize the relay H, permitting the contact plate 53 to move up as a result of which the refrigerating system B will again be put into action to reduce the car temperature below 76°, after which this control circuit through thermostat g will be broken and the refrigerating system will again cease to operate. If the outside temperature rises above 90°, the outside thermostat o will complete a circuit which will deenergize the relay K, this circuit being as follows: From one terminal of solenoid coil 76 through wire 103, thermostat o, and wire 104 to the other terminal of the coil 76. The inside thermostat h will now be put in control of the refrigerating system, this control circuit being as follows: From one terminal of coil 47 of relay H through wire 92, thermostat m, wire 93, wire 94, thermostat f, wire 95, thermostat g, wires 102 and 105, thermostat h, and wires 106 and 99 back to the other terminal of coil 47. The thermostat h will now operate in the same manner as described in connection with thermostats f or g to maintain a temperature within the car of approximately 80°.

A fourth inside thermostat e is provided which functions to maintain a lower car temperature, for example 65°. As here shown this thermostat is shunted around the thermostat f by means of a circuit including the wire 107, normally open switch 108, wire 109, thermostat e and wire 110. If switch 108 is closed, the thermostat e will replace the thermostat f in control of the system and will permit the refrigerating means B to operate whenever the temperature rises above 65° within the car. This thermostat may be used to provide a more comfortable sleeping temperature at night in Pullman cars, or may be used if for any other reason it is desired to maintain this lower temperature. As here shown, this thermostat e will only be operative so long as the outside temperature is below 80°, but by simply connecting the wire 110 with wire 99 instead of with wire 95 as now shown, the thermostat e could be made operative at any outside temperature above 65°.

It will be noted that all of the control circuits of the inside thermostats e, f, g and h pass through the outside thermostat m so that when the temperature outside the car falls below 65°, the refrigerating apparatus is inoperative. It is therefore impossible to have the heating apparatus A and the refrigerating apparatus B in operation simultaneously and wastefully neutralize one another, since the outside thermostat k will not permit the heating system to operate when the outside temperature is above 65°, and the outside thermostat m will not permit the refrigerating system to operate when the outside temperature is below 65°. It will thus be seen that the outside thermostatic mechanism F not only determines whether the heating system or the refrigerating system (but not both) shall be operative, but also selects the temperature to be maintained by such system within the car. Aside from the extreme temperatures which may be maintained at night or under other unusual conditions by the thermostats d or e, the control system is entirely automatic and needs no attention whatever, and is regulated entirely by the temperature prevailing outside of the car.

It will be apparent that equivalents might be substituted for the instrumentalities here shown by way of example, and that the number of thermostats used and the temperatures at which these thermostats function could be changed without departing from the scope of the invention as set forth in the claims which follow.

Although this improved temperature control system has been designed especially for use in railway passenger cars where the maintenance of the comfort and health of the passenger is the prime consideration, it will be apparent that the same system or obvious modifications thereof could be used in other types of railway cars or other conveyances. Furthermore such a control system might be used for regulating the temperature within enclosures other than moving vehicles and it is intended that such adaptations, so far as applicable, shall be included within the scope of the claims which follow.

We claim:

1. In combination with heat-exchange apparatus comprising both heating and cooling means for maintaining a desired temperature within a car either above or below the outside temperature, regulating means for automatically controlling the action of the heat-exchange apparatus to maintain a selected car temperature, and thermostatic means positioned outside the car and responsive to outside temperatures, said thermostatic means being operatively connected with the regulating means and functioning to select the temperature to be maintained by the regulating means.

2. In combination with heat-exchange apparatus comprising both heating and cooling means for maintaining a desired temperature within a car either above or below the outside temperature, electrically operated regulating means for automatically controlling the action of the heat-exchange apparatus to maintain a selected car temperature, and thermostatic means positioned outside the car and responsive to outside temperatures, said thermostatic means being operatively connected with the regulating means and functioning to select the temperature to be maintained by the regulating means.

3. In combination with heat-exchange apparatus comprising both heating and cooling means for maintaining a desired temperature within a car either above or below the outside temperature, regulating means for automatically controlling the action of the heat-exchange apparatus to maintain a selected car temperature, said means comprising a plurality of thermostats positioned within the car and progressively operative at different car temperatures, and thermostatic means positioned outside the car and responsive to outside temperatures, said thermostatic means being operatively connected with the regulating means and functioning to select the temperature to be maintained by the regulating means.

4. In combination with heat-exchange apparatus comprising both heating and cooling means for maintaining a desired temperature within a car either above or below the outside temperature, regulating means for automatically controlling the action of the heat-exchange apparatus to maintain a selected car temperature, said means comprising a plurality of thermostats positioned within the car and progressively operative at different car temperatures, and thermostatic means positioned outside the car and responsive to outside temperatures for determining the inside thermostat which shall control the car temperature.

5. In combination with apparatus comprising both heating and cooling means for imparting heat to or withdrawing heat from the air within a car, regulating means for automatically controlling this apparatus to maintain a desired temperature within the car, and thermostatic means positioned outside the car and responsive to outside temperatures, said thermostatic means being operatively connected to and cooperating with the regulating means to determine the temperature to be maintained within the car.

6. Apparatus for regulating the temperature within an enclosure comprising, a heating means, a refrigerating means, thermostatic regulating means for controlling either the heating means or the refrigerating means to maintain a selected temperature within the enclosure, and thermostatic means positioned outside the enclosure and responsive to outside temperatures for selecting the temperature to be maintained by the regulating means.

7. Apparatus for regulating the temperature within an enclosure comprising, a heating means, a refrigerating means, thermostatic regulating means for controlling either the heating means or the refrigerating means to maintain a selected temperature within the enclosure, and thermostatic means positioned outside the enclosure and responsive to outside temperatures, said means cooperating with the regulating means to select the temperature to be maintained by the regulating means.

8. Apparatus for regulating the temperature within an enclosure comprising, a heating means, a refrigerating means, thermostatic regulating means for controlling either the heating means or the refrigerating means to maintain a selected temperature within the enclosure, and thermostatic means positioned outside the enclosure and responsive to outside temperatures, said means cooperating with the regulating means to render the heating means operative and the refrigerating means inoperative when the outside temperature is below a predetermined critical temperature, and for rendering the refrigerating means operative and the heating means inoperative at outside temperatures above this critical temperature, said outside thermostatic means also functioning to select the temperature to be maintained within the enclosure.

9. Apparatus for regulating the temperature within an enclosure comprising, a heating means, a refrigerating means, electrically operated thermostatic regulating means adapted to automatically maintain a selected temperature within the enclosure, said regulating means comprising a plurality of thermostats selectively operative to control the heating means and a plurality of thermostats selectively operative to control the refrigerating means, and thermostatic means positioned outside the enclosure and responsive to outside temperatures to render either the heating means or the refrigerating means operative, but not both at any one time, and to determine which inside thermostat shall be temporarily in control to maintain a selected temperature.

10. Apparatus for regulating the temperature within an enclosure comprising, a heating means, a refrigerating means, electrically operated thermostatic regulating means adapted to automatically maintain a selected temperature within the enclosure, said regulating means comprising a plurality of thermostats selectively operative to control the heating means and a plurality of thermostats selectively operative to control the refrigerating means, and thermostatic means positioned outside the enclosure and responsive to outside temperatures to select the temperature to be maintained within the enclosure.

11. Apparatus for regulating the temperature within an enclosure comprising, a heating means, a refrigerating means, electrically operated thermostatic regulating means adapted to automatically maintain a selected temperature within the enclosure, said regulating means comprising a plurality of thermostats selectively operative to control the heating means and a plurality of thermostats selectively operative to control the refrigerating means, and means positioned outside the enclosure and comprising a plurality of thermostats progressively functioning at different outside temperatures to select the temperature to be maintained within the enclosure.

12. Apparatus for regulating the temperature within an enclosure comprising, a heating means, a refrigerating means, electrically operated thermostatic regulating means adapted to automatically maintain a selected temperature within the enclosure, said regulating means comprising a plurality of thermostats selectively operative to control the heating means and a plurality of thermostats selectively operative to control the refrigerating means, and means positioned outside the enclosure and comprising a plurality of thermostats progressively functioning at different outside temperatures and cooperating with the inside thermostats to determine whether the heating means or the refrigerating means shall be operative and to select the temperature to be maintained within the enclosure.

13. Apparatus for regulating the temperature within an enclosure comprising, a heating means, a refrigerating means, electrically operated thermostatic regulating means adapted to automatically maintain a selected temperature within the enclosure, said regulating means comprising a plurality of thermostats selectively operative to control the heating means and a plurality of thermostats selectively operative to control the refrigerating means, and means positioned outside the enclosure and comprising a plurality of thermostats progressively functioning at different outside temperatures and cooperating with the inside thermostats to determine whether the heating means or the refrigerating means shall be operative and to select the temperature to be maintained within the enclosure, each of said groups of inside thermostats including a normally inoperative thermostat, and a manually closable circuit for said thermostat, whereby temperatures lower than normally desirable but either higher or lower than the outside temperature may be maintained by the heating means or refrigerating means respectively.

14. A system for maintaining different predetermined temperatures of a regulated medium in accordance with temperature changes in a controlling medium, said system having, in combination, a device operable to increase or decrease the temperature of said regulated medium, three independently operable thermostats responsive to different predetermined temperatures of said regulated medium and each adapted, when active to control said device, to cause a change in the temperature of the regulated medium according to whether the temperature of the latter is above or below the value for which the controlling thermostat is set to respond, an auxiliary thermostat responsive to a predetermined temperature of said controlling medium and operable in response to a fall in the temperature below said predetermined value to place one of said first mentioned thermostats in active control of said device and to place a second thermostat in control of the device when the temperature of the controlling medium rises above said predetermined value, and a second auxiliary thermostat for shifting the control of said device to said last mentioned thermostat or to the third thermostat depending on whether the temperature of the controlling medium is above or below a predetermined temperature different from the temperature to which said first mentioned auxiliary thermostat is adapted to respond.

15. The combination of a temperature regulating device, three room or insertion thermostats set to respond to different temperatures and each arranged for active control of said device, an auxiliary thermostat arranged to transfer the control of said device from one to another of said first mentioned thermostats in response to a change in temperature through a predetermined value, and a second auxiliary thermostat arranged to transfer the control of said device from one of said last mentioned thermostats to the third of said first mentioned thermostats in response to a change in temperature through a predetermined different value.

16. In combination with heat-exchange apparatus for maintaining a desired temperature within a space, regulating means for automatically controlling the action of the heat-exchange apparatus to maintain a selected space temperature, said means comprising a plurality of thermostats positioned within the space and progressively operative at different space temperatures, and means comprising a plurality of thermostats positioned outside the space and operatively connected with the regulating means, said outside thermostats progressively functioning at different outside temperatures to select the temperature to be maintained within the space by the regulating means.

17. In combination with heat-exchange apparatus for maintaining a desired temperature within a space, regulating means for automatically controlling the action of the heat-exchange apparatus to maintain a selected space temperature, said means comprising a plurality of thermostats positioned within the space and progressively operative at different space temperatures, and means comprising a plurality of thermostats positioned outside the space and progressively functioning at different outside temperatures to determine the inside thermostat which shall control the space temperature.

18. In combination with an electrically controlled heat exchanging system for enclosures, a plurality of thermostats adapted to be connected in the control circuit to govern the operation of the heat exchangers and operating responsive to different predetermined inside temperatures; a series of thermostats outside the enclosure operating responsive to different predetermined outside temperatures, and a second circuit including a plurality of relays controlled by the outside thermostats, said relays being arranged automatically to connect the respective inside thermostats in the control circuit.

19. In combination with means forming an air space, apparatus for cooling said space, a mechanism for controlling said apparatus comprising a thermostatic means responsive to temperature changes inside the space, and thermostatic means responsive to temperature changes outside the space, said outside thermostatic means functioning to select the temperature to be maintained by the inside thermostatic means so that a constant low inside temperature will be maintained for all outside temperatures above this inside temperature but below a predetermined outside temperature, and for all outside temperatures above a predetermined maximum a second constant inside temperature will be maintained, the second inside temperature being higher than the first inside temperature but the difference between these inside temperatures being less than the difference between the first predetermined outside temperature and the predetermined maximum outside temperature, the inside temperature being increased between these inside limits as the outside temperature rises from the first predetermined temperature to the said predetermined maximum.

PAUL B. PARKS.
WILLIAM M. SMITH.